United States Patent
Iyer (10) Patent No.: US 8,021,553 B2
(45) Date of Patent: Sep. 20, 2011

(54) SYSTEMS AND METHODS FOR FORWARD OSMOSIS FLUID PURIFICATION USING CLOUD POINT EXTRACTION

(75) Inventor: Subramanian Iyer, Yorba Linda, CA (US)

(73) Assignee: NRGTEK, Inc., Orange, CA (US)

( * ) Notice: Subject to any disclaimer, the term of this patent is extended or adjusted under 35 U.S.C. 154(b) by 65 days.

(21) Appl. No.: 12/338,990

(22) Filed: Dec. 18, 2008

(65) Prior Publication Data

US 2010/0155329 A1    Jun. 24, 2010

(51) Int. Cl.
*C02F 1/44* (2006.01)

(52) U.S. Cl. ............................ 210/636; 210/634; 210/177

(58) Field of Classification Search ........................ None
See application file for complete search history.

(56) References Cited

U.S. PATENT DOCUMENTS

| | | | |
|---|---|---|---|
| 3,721,621 A | | 3/1973 | Hough |
| 5,679,254 A * | | 10/1997 | Chakrabarti ................. 210/642 |
| 6,391,205 B1 * | | 5/2002 | McGinnis ..................... 210/644 |
| 2006/0144789 A1 * | | 7/2006 | Cath et al. ..................... 210/641 |
| 2007/0246426 A1 | | 10/2007 | Collins |

OTHER PUBLICATIONS

McCutcheon et al. "A novel ammonia-carbon dioxide forward (direct) osmosis desalination process," Desalination 2005, 174, 1-11.*

Petrotos, K. B. et al. "study of the direct osmotic concentration of tomato juice in tubular membrane—module configuration. I. The effect of certain basic process parameters on the process performance," Journal of Membrane Science 150 (1998) 99-110.*

Adham, S. et al. "Dewatering Reverse Osmosis Concentrate from Water Reuse Applications using Forward Osmosis," WateReuse Foundation, Alexandria, VA, 2007, p. 13.*

Saeki, S. et al. "Upper and lower critical solution temperatures in poly(ethylene glycol) solutions," Polyer 1976, 17, 685-689.*

Joergensen, M. K. "Investigation of Polypropylene Glycol 425 as Possible Draw Solution for Forward Osmosis," Masters Thesis, Aalborg University, Denmark, Jun. 2009.*

International Search Report for PCT/US 09/68590, dated Feb. 19, 2010.

Written Opinion of the International Searching Authority for PCT/US09/68590, dated Feb. 19, 2010.

Cath, T.Y. et al., "Forward Osmosis: Principles, Applications, and Recent Developments," Journal of Membrane Science, 2006, pp. 70-87, vol. 281.

* cited by examiner

*Primary Examiner* — Yelena Gakh
*Assistant Examiner* — Michelle Adams
(74) *Attorney, Agent, or Firm* — Knobbe, Martens, Olson & Bear LLP (57) ABSTRACT

A process for purification of fluids, for example, desalination of seawater or brackish water, using organic solutes in a concentrated water solution for use in a forward osmosis process, to extract fresh water out of salt water through the forward osmosis membrane, and subsequently separating the organic solutes out of the diluted forward osmosis permeate by cloud point extraction, thereby regenerating a concentrated organic solution for recycling to the forward osmosis process, and fresh water for potable water use.

6 Claims, 3 Drawing Sheets

SYSTEMS AND METHODS FOR FORWARD OSMOSIS FLUID PURIFICATION USING CLOUD POINT EXTRACTION

BACKGROUND

1. Technical Field

This disclosure relates generally to the purification of fluids and more specifically to the desalination and purification of seawater or brackish water.

2. Related Art

Today's world has increasingly greater need for fresh, drinkable water. Current desertification is taking place much faster worldwide than historically, arising from the demands of increased populations. In addition, freshwater resources are being depleted, escalating the need for a new economically efficient way to produce potable water.

The abundant availability of seawater and development of new technologies for desalination of brine and brackish waters will be a potential solution to the pressing worldwide problem of limited freshwater supplies and sources, with major societal benefits and impacts. Thus there is global demand for desalination and fluid purification in general.

Desalination using membrane processes, which mainly rely upon reverse osmosis (RO), are presently the fastest growing technology, approximating around 22% of world desalination capacity. Reverse osmosis uses dynamic pressure to overcome the osmotic pressure of salt solutions, allowing water-selective permeation of salt-free water to migrate from the saline side of a membrane to the freshwater side. However, RO systems need high pressures (50 to 100 atm or 800 to 1500 psi) and extensive pre-treatment of seawater to allow sufficient permeation through the RO membrane, leading to a seawater conversion rate between about 35 to 50%. Furthermore, initial membrane costs and replacement issues lead to high capital investments and operating costs for RO systems.

Notwithstanding the advancement in water purification techniques, and in particular water desalination (purification) technology, the capital and operating costs of these processes remain significantly higher than the cost of retrieving natural fresh water and delivering it as potable fresh water. Water, in the United States, is typically priced for wholesale at $100 to $450 per acre-foot, depending on geographic location and proximity to freshwater sources. In California, the wholesale cost of freshwater is approximately $500 per acre-foot. Presently, the cost of desalination is in the range of $617 to $987 per acre-foot of desalinated water. Desalination of brackish water by RO processes, while cheaper, is still relatively expensive, ranging from $247 to $432 per acre-foot.

Consequently, a need remains for water purification processes that can operate with lower energy requirements, higher efficiency, and/or lower costs than the current state-of-the-art fluid purification processes.

SUMMARY

The systems and methods disclosed herein utilize forward osmosis for fluid purification, such as seawater desalinization and brackish water purification. Various embodiments include the realization that the function of forward osmosis can be improved through the use of one or more cloud-point solutes to generate high osmotic pressure differentials with the salt water or fluid to be treated. The use of cloud point solutes can advantageously permit recycling of the forward osmosis permeate through cloud-point extraction. The result is systems and methods that can operate with lower energy requirements, lower operating temperatures and pressures, higher efficiency, high flux rates of fluids, and/or lower costs than previous fluid purification processes such as reverse osmosis.

In certain embodiments, forward osmosis systems and methods are disclosed comprising a closed processing loop. The systems and methods take salt water input and discharge purified water for potable water use and concentrated brine for discharge to the ocean or to commercial uses. The cloud point solutes that drive forward osmosis of water from the salt water are recovered through cloud point precipitation and filtration and reused in future processing.

In various embodiments, forward osmosis fluid purification systems are provided. A system can comprise a semi-permeable membrane having a feed solution-facing surface opposite a draw solution-facing surface. A system can comprise a feed solution in communication with the feed solution-facing surface of the semi-permeable membrane, wherein the feed solution comprises a fluid to be purified and impurities dissolved in the fluid to be purified. The system can comprise a draw solution in communication with the draw solution-facing surface of the semi-permeable membrane. The system can comprise a precipitation system configured precipitate the at least one cloud point solute from the draw solution.

A forward osmosis fluid purification system can comprise a feed solution chamber and a feed solution disposed in the feed solution chamber comprising a fluid and impurities dissolved in the fluid. A system can comprise a draw solution chamber and a draw solution disposed in the draw solution chamber comprising the fluids and at least one cloud point solute dissolved in the fluid. A system can comprise a a semi-permeable membrane disposed between the feed solution chamber and the draw solution chamber separating the feed solution from the draw solution, wherein the membrane is configured to permit diffusion of the fluid from the feed solution into the draw solution. A system can comprise a precipitation system in communication with the draw solution chamber, wherein the precipitation system is configured to cause precipitation of the at least one cloud point solute in the draw solution. A system can comprise a a filtration system in communication with the precipitation system configured to separate at least a portion of the precipitated at least one cloud point solute from the fluid in the draw solution. A system can comprise a return line in communication with the filtration system configured to receive the separated at least one cloud point solute and return the at least one cloud point solute to the draw solution chamber. A system can comprise an outlet line in communication with the filtration system configured to receive the fluid separated from the draw solution.

The draw solution can comprise at least one cloud point solute. The concentration of the at least one cloud point solute in the draw solution can be greater than the concentration of the impurities in the feed solution. The feed solution can comprise seawater or brackish water. The fluid to be purified can be water. The solubility of the at least one cloud point solute in the fluid to be purified can be a molar ratio of at least 3:1. The at least one cloud point solute can have a molecular weight between about 300 Da and 800 Da. The at least one cloud point solute can comprise a hydrophobic component and a hydrophilic component. The at least one cloud point solute can comprise a polyoxyorganic chain. The at least one cloud point solute can comprise a polyethylene glycol or a polypropylene glycol. The at least one cloud point solute can comprise a polyethylene glycol selected from the group consisting of FA PEG-300, FA PEG-400, PEG-400 ML, and FA PEG-600. The at least one cloud point solute can comprise an ethoxylate. The at least one cloud point solute comprises a fatty acid ethoxylate or a fatty alcohol ethoxylate. The concentration of the at least one cloud point solute in the draw solution can be between about 30% and 75%. The concentration of the at least one cloud point solute in the draw solution can be between about 50% and 70%.

The precipitation system can comprise a heater configured to heat the draw solution to at least the cloud point temperature of the draw solution. The precipitation system can comprises a gas treatment system configured to add at least one water-insoluble gas to the draw solution to lower the cloud point of the draw solution.

The system can comprise a filtration system configured to remove the precipitated at least one cloud point solute from the fluid to be purified in the draw solution. The filtration system can comprise a nanofiltration membrane or an ultrafiltration membrane. The system can comprise a redissolution system configured to redissolve the precipitated cloud point solutes to form a recycled draw solution.

In various embodiments, methods for purifying fluids are provided. A method can comprise disposing a feed solution and a draw solution opposite a semi-permeable membrane. The feed solution can comprise a fluid to be purified and impurities dissolved in the fluid to be purified. The draw solution can comprise at least one cloud point solute. The concentration of the at least one cloud point solute in the draw solution can be greater than the initial concentration of the impurities in the feed solution. The method can comprise allowing a quantity of the fluid to be purified to diffuse from the feed solution, through the semi-permeable membrane, and into the draw solution through forward osmosis. The method can comprise precipitating the cloud point solutes from the fluid to be purified in the draw solution. The method can comprise treating the draw solution to cause precipitation of the cloud point solutes. The method can comprise passing the draw solution through a filtration system to separate at least a portion of the precipitated at least one cloud point solute from the fluid to be purified. The method can comprise returning the separated at least one cloud point solute to the draw solution opposite the semi-permeable membrane.

The feed solution can comprise seawater or brackish water. The fluid to be purified can be water. Precipitating the cloud point solutes can comprise adding at least one water-insoluble gas to lower the cloud point of the draw solution. Precipitating the cloud point solutes can comprise heating the draw solution to at least the cloud point of the draw solution.

The method can comprise removing the precipitated cloud point solutes from the draw solution. Removing the precipitated cloud point solutes can comprise filtering the draw solution through a nanofiltration membrane. The method can comprise redissolving the precipitated cloud point solutes to form a recycled draw solution. Redissolving the precipitated cloud point solutes can comprise flushing the nanofiltration membrane at a temperature below the cloud point temperature of the cloud point solutes.

In various embodiments, assemblies for forward osmosis are provided. An assembly can comprise a semi-permeable membrane having a feed solution-facing surface opposite a draw solution-facing surface. The assembly can comprise a feed solution input in communication with the feed solution-facing surface of the semi-permeable membrane, wherein the feed solution input is configured to supply a feed solution comprising a fluid to be purified and impurities dissolved in the fluid. The assembly can comprise a draw solution preparation in communication with the draw solution-facing surface of the semi-permeable membrane, wherein the draw solution preparation comprises at least one cloud point solute.

The at least one cloud point solute can have a molecular weight between about 300 Da and 800 Da. The at least one cloud point solute can comprises a hydrophobic component and a hydrophilic component. The at least one cloud point solute can comprise a polyoxyorganic chain. The at least one cloud point solute can comprise a polyethylene glycol or a polypropylene glycol. The at least one cloud point solute can comprise a polyethylene glycol selected from the group consisting of FA PEG-300, FA PEG-400, PEG-400 ML, and FA PEG-600. The at least one cloud point solute can comprise an ethoxylate. The at least one cloud point solute comprises a fatty acid ethoxylate or a fatty alcohol ethoxylate.

In various embodiments, processes for purification of solvents are provided. A process can comprise inducing forward osmosis across a semi-permeable membrane by creating an osmotic pressure differential using a draw solution comprising one or more solutes having a cloud point below the boiling point of the solvent, whereby the draw solution becomes more diluted as solvent is drawn across the membrane. The process can comprise heating the diluted draw solution to just above the cloud point temperature to trigger phase separation of the solute. The process can comprise separating the solutes from the draw solution by filtration. The process can comprise retrieving the solutes for recyleable use in the forward osmosis process.

At least one of the solutes can comprise an organic compound characterized by a high osmotic pressure. At least one of the solutes can comprise a polymeric compound characterized by a high osmotic pressure. The solute can comprise a molecular weight of about 200-600.

In various embodiments, processes for desalination of salinated water are provided. A process can comprise osmotically separating pure water from salinated water by inducing forward osmosis through a semi-permeable membrane by creating an osmotic pressure differential across the membrane using concentrated solutions of solutes in water to create a solution with higher osmotic pressure than the desalinated water. The osmotic separation can serve to drive pure water across the membrane from the salinated water side to the side containing the solutes by virtue of the high solubility and high osmotic pressures in the solvent of the solutes being used. The osmotic separation through forward osmosis can result in a diluted solution. The process can comprise inducing clouding of the diluted solution of solutes by heating the solution to above the cloud point of the solutes by reaching a temperature at which a solubility inversion of the solute in the solvent occurs, thereby reducing its solubility and causing it to precipitate out of the solution. The process can comprise separating potable water as a permeate from the organic solutes by a mechanism of filtration. The process can comprise re-dissolving the clouded solutes filtered out from the water by reverse flushing the filtration system at a temperature below the cloud point of the solutes and generating a solution of concentrated organic solutes in water for recycling for use in forward osmosis processing.

At least some of the solutes can comprise organic solutes. At least some of the solutes can comprise polymeric solutes. At least some of the organic solutes can have a cloud point well below the boiling point of water in the temperature range of about 35-70° C.

Inducing clouding can be achieved by the addition of water-insoluble gases in order to lower the cloud point of the solution to ambient temperatures or thereabout. At least some of the solutes can have a molecular weight of between about 300-800 Daltons. The solutes can comprise a hydrophobic component and a hydrophilic component to generate sufficiently high osmotic pressures to drive water across a semipermeable membrane by the process of forward osmosis. The solutes can have a high solubility in the solvent greater than 3 molar ratios to generate sufficiently high osmotic pressures to drive water across a semi-permeable membrane by the process of forward osmosis.

In various embodiments, systems for purification of a solvent are provided. A system can comprise a forward osmosis apparatus comprising a semi-permeable membrane, the apparatus configured to permit the creation of an osmotic pressure differential across the membrane using a draw solution comprising one or more solutes having a cloud point substantially below the boiling point of the solvent, whereby the draw solution becomes more diluted as solvent is drawn across the membrane. The system can comprise a mechanism for inducing clouding of the solutes in the draw solution after becoming diluted in the forward osmosis apparatus. The system can comprise a filtration mechanism for separating the solutes from the solvent in a manner such that the solutes may be recovered for recycling in the forward osmosis apparatus.

For purposes of summarizing the embodiments and the advantages achieved over the prior art, certain items and advantages are described herein. Of course, it is to be understood that not necessarily all such items or advantages may be achieved in accordance with any particular embodiment. Thus, for example, those skilled in the art will recognize that the inventions may be embodied or carried out in a manner that achieves or optimizes one advantage or group of advantages as taught or suggested herein without necessarily achieving other advantages as may be taught or suggested herein.

BRIEF DESCRIPTION OF THE DRAWINGS

A general architecture that implements the various features of the disclosed systems and methods will now be described with reference to the drawings. The drawings and the associated descriptions are provided to illustrate embodiments and not to limit the scope of the disclosure.

Throughout the drawings, reference numbers are re-used to indicate correspondence between referenced elements. In addition, the first digit of each reference number indicates the figure in which the element first appears.

DETAILED DESCRIPTION

Figure 1:
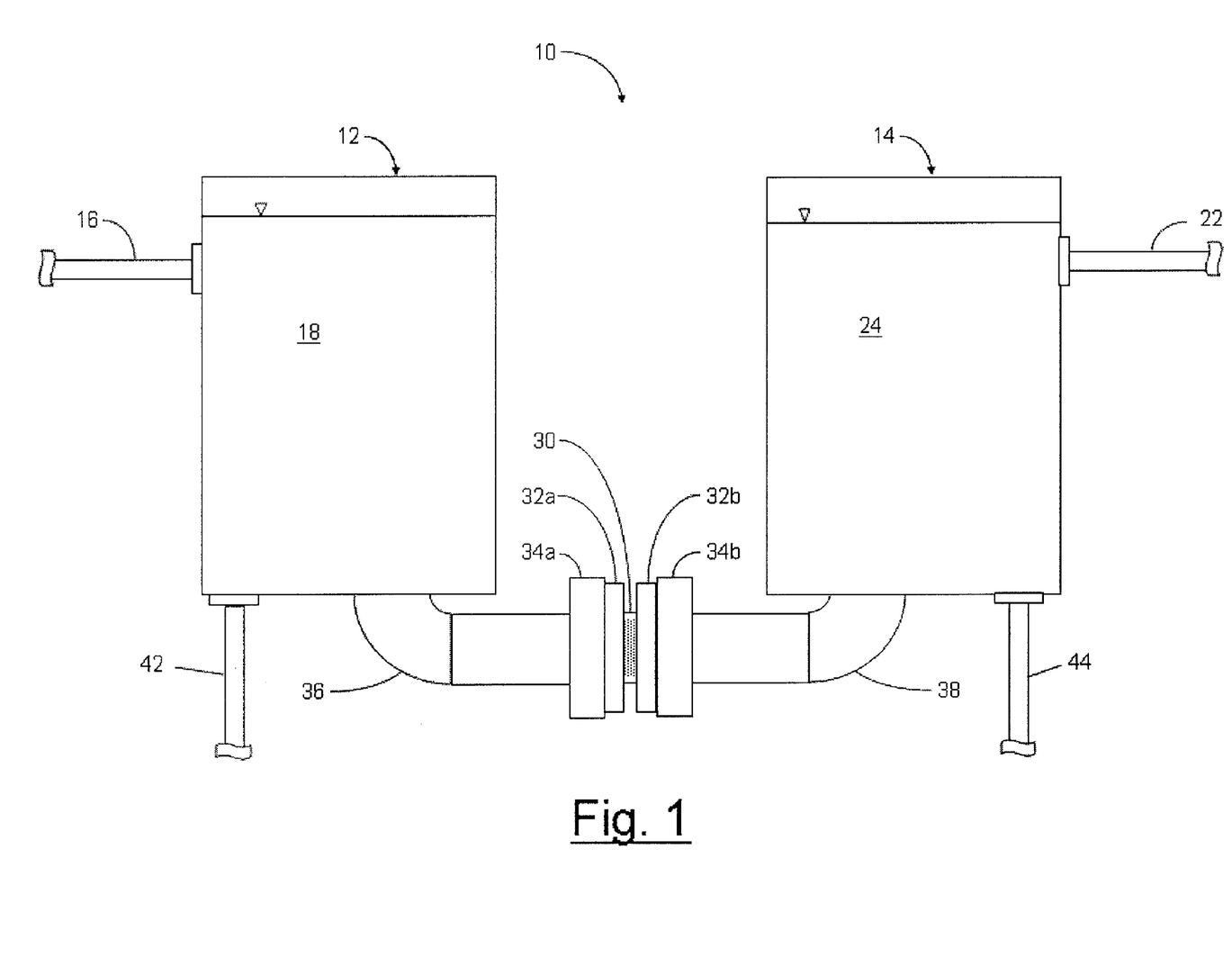
FIG. 1 is a schematic representation of a forward osmosis system.

For a more detailed understanding of the disclosure, reference is first made to FIG. 1, which illustrates a schematic representation of an example forward osmosis system 10. The forward osmosis system 10 comprises a feed solution 18 and a draw solution 24 separated by a semi-permeable membrane 30.

The feed solution reservoir 12 is configured to hold a feed solution 18. The feed solution reservoir 12 can receive the feed solution 18 from a first source (not shown) through a first conduit 16. In the example embodiment, the feed solution 18 is in fluid communication with the membrane 30 via an optional first bulkhead 36.

The draw solution reservoir 14 is configured to hold a draw solution 24. The draw solution reservoir 14 can receive the draw solution 14 from a second source (not shown) through a second conduit 22. In the example embodiment, the draw solution 24 is in fluid communication with the membrane 30 via an optional second bulkhead 36.

Feed Solution

The feed solution 18 comprises a fluid to be purified and one or more impurities. In at least one embodiment, the feed solution comprises between about 35,000 and 40,000 ppm of salts in water, for example, seawater. In at least one embodiment, the feed solution comprises between about 10,000 and 35,000 ppm of salts in water, for example, brackish water. Many temperatures and pressures are suitable for providing the feed solution 18. For example, the feed solution 18 can be provided at ambient temperatures and pressures of seawater.

The systems and methods disclosed herein are also applicable to numerous fluid purification applications where it is desirous to remove at least one contaminant or solute from a fluid, e.g., waste water purification and contaminated water purification.

Draw Solution

The draw solution 24 comprises the fluid to be purified and one or more cloud point solutes. A cloud point solute exhibits reverse solubility versus temperature behavior than what is ordinarily expected for a solute mixed with a solvent. Many temperatures and pressures are suitable for providing the draw solution 24. For example, the draw solution 24 can be provided at ambient temperatures and pressures of seawater.

Cloud Point Solutes

A cloud point solute is soluble in a solvent at lower temperatures but "clouds out" of the solvent as a cloudy precipitate at higher temperatures. Depending on the specific gravity of the cloud point solute, either the cloud point solute settles down to the bottom or floats on top of the solvent. Thus, certain cloud point solutions can exhibit phase separation into two or more immiscible phases at higher temperatures. Preferably, the clouding effect is also reversible. That is, upon cooling, the solution will re-clarify.

The temperature at which the dissolved solutes begin to precipitate is called the "cloud point." This behavior is characteristic of certain polymeric and/or organic compounds, including various surfactants, dispersants, foaming agents, emulsifiers, emollients, and lubricants.

A number of cloud point solute compositions are suitable for use in various embodiments disclosed herein. Preferably, the cloud point solutes have a molecular mass of at least about 200 Da. In preferred embodiments, the cloud point solutes have a molecular mass between about 300 Da and 800 Da, e.g., 300, 400, 600 Da, or 800 Da. Preferably, the one or more cloud point solutes are selected such that the solutes exhibit high solubility and/or miscibility in water below the cloud point, thus enabling the generation of high osmotic pressure differentials, resulting in high fluid flux rates. In certain embodiments, the solubility of the cloud point solutes is at least about 2 molar ratios, preferably at least 3 molar ratios to generate sufficiently high osmotic pressures to drive water across the semi-permeable membrane by the process of forward osmosis.

Certain embodiments include the realization that forward osmosis flux rates can be improved through the use of cloud point solutes comprising a hydrophobic component and a hydrophilic component, such as a surfactant. The solubility in water of solutes with a hydrophobic component and a hydrophilic component is based on the hydration of the oxygen groups in the compound via hydrogen bonding. Since this hydration decreases with increasing temperature, the solubility of these compounds in water decreases accordingly. In certain embodiments, these solutes are nonionic organic compounds. In certain embodiments, the solutes are polymers.

Additional examples of desirable solutes comprising a hydrophobic component and a hydrophilic component are organic compounds with polyoxyorganic chains, such as polyoxyethylene or polyoxypropylene chains. Preferred solutes include polyethylene glycols (for example, fatty acid or fatty alcohol polyethylene glycols, like FA PEG-300, -400, and -600 and PEG-400 ML) and polypropylene glycols. Additional examples desirable solutes include ethoxylates, such as fatty acid ethoxylates and fatty alcohol ethoxylates.

The cloud point temperature depends on the composition and concentration of the cloud point solute(s) used. In certain preferred embodiments, the cloud point solute(s) are selected such that the draw solution has a single cloud point. In various embodiments, the cloud point solute composition and concentration are selected such that the cloud point is at least about 10C.° (50F.°) higher than the ambient temperature of the feed solution. In certain embodiments, the cloud point is between about 30° C.(90° F.) and 75° C. (170° F.), between about 35° C. (95° F.) and 70° C. (160° F.), or between about 40° C. (100° F.) and 50° C. (120° F.). Preferably, the cloud point solutes have a tendency to cloud at a temperature range from about 45° C. (110° F.) or 50° C. (120° F.) to 70° C. (160° F.) It cloud point solutes have a tendency to cloud at a concentration range between about 5% and 20% solute in water.

The stability of various cloud point solvents was tested at various temperatures. For temperatures ranging from 25° C. to 100° C., there were no significant changes found in pH, color, volume, and weight.

The cloud point solutes in the draw solution 24 are at a greater concentration than the impurities in the feed solution 18. Preferably, the initial concentration of cloud point solutes in the draw solution is at least two or three times greater than the impurities in the feed solution. More preferably, the initial concentration in the draw solution is at least four or five times greater than the feed solution. Most preferably, the initial concentration of the draw solution is at least eight, nine, ten, or eleven times greater than the feed solution. In certain embodiments, the initial concentration of the cloud point solutes in the fluid to be purified is between about 30% and 75%. In certain embodiments, the initial concentration of the cloud point solutes is between about 50% and 70%, e.g., 67.5%.

Membrane

Returning again to the example embodiment of FIG. 1, the membrane 30 is disposed between two gaskets (first gasket 32a and second gasket 32b) and two flanges (first flange 34a and second flange 34b). In the example embodiment, the gaskets 32a, 32b and flanges 34a, 34b serve to position the membrane in use. The flange-and-gasket system is merely an example, and alternative techniques can be used for positioning the membrane 30 in the forward osmosis system 10.

The membrane 30 is permeable to the fluid to be purified and substantially impermeable to the one or more impurities in the feed solution. Preferably, the membrane is substantially impermeable to the one or more cloud point solutes in the draw solution.

Preferred embodiments comprise at least one forward osmosis membrane. Examples of suitable forward osmosis membranes include membranes manufactured by Hydration Technologies Inc. such as SEAPACK™, X-PACK™, and HYDROWELL™ membranes. The SEAPACK™ and X-PACK™ membranes comprise cellulose triacetate (CTA) on a heat-welded polyethylene/polyester backing. The HYDROWELL™ membrane comprises a CTA cast with an embedded polyester screen.

Commercially available reverse osmosis membrane are also suitable for use in the forward osmosis system 10. These membranes include Thin Film Composite (TFC) and CTA membranes. TFC membranes are composed of multiple layers and use an active thin-film layer of Polyimide layered with Polysulfone as a porous support layer. CTA membranes are manufactured from Cellulose and Acetate. They are organic by nature and require disinfection to prevent growth of bacteria. Examples of suitable reverse osmosis membranes are listed below in Table 1.

TABLE 1

Commercially Available Membranes

| Membrane | Specifications |
|---|---|
| Culligan Compatible CTA-16-C RO membrane | 16 gals/day |
| Culligan Compatible TFM-18a RO membrane | 18 gals/day membrane; reduces Fl, Pb, Ba, Cd, Cr, Hg, nitrate, nitrite |
| Hydrotech CTA 15 GPD membrane | 15 gals/day |
| Hydrotech TFC 15 GPD membrane | 15 gals/day |
| Microline CTA-14 RO membrane | 14 gals/day |
| Microline TFC-25 GPD RO membrane | 25 gals/day; "dry" design, can be stored for over a yr; replace every 2 yrs |
| Rainsoft Ultrefiner Compatible CTA RS9-10 | 10 gals/day; best for chlorinated water |
| Rainsoft Ultrefiner Compatible TFC-RS9-12 | 12 gals/day |

The specifications for the above reverse osmosis membranes are listed below in Table 2. Performance of these membranes, per manufacturers' specifications, is rated by selectivity, chemical resistance, operational pressure differential, and the pure water flow rate per unit area. The preferred conditions for use of these membranes include timely hydration of the membranes just prior to use.

TABLE 2

TFC Membranes vs. CTA Membranes

| Characteristics | TFC Membranes | CTA Membranes |
|---|---|---|
| Water rate (to atmosphere @ 60 psi, 77° F.) | 22 gals/day | 24-35 gals/day |
| Maximum feed water total dissolved salts (TDS) (w/sufficient line pressure) | 1200 mg/l | 2000 mg/l |
| Maximum feed water hardness | 10 gpg | 10 gpg |
| Rejection of TDS | 88-93% | 95-98% |
| Feed water temperature | 40-86° F./ 4-30° C. | 40-113° F./4-45° C. |
| Feed water pH | 3.0-9.0 | 2.0-11.0 |
| Maximum feed pressure (in suitable pressure vessel) | 50-100 psi | 50-100 psi |
| Booster pump pressure | 80 psi | 80 psi |
| Chlorine Tolerance | excess of 10,000 mgl | sensitive to chlorine & other oxidizers |

Forward Osmosis Process

The driving force for purification of the fluid is the difference in concentrations (that is, the difference in osmotic pressures or the "osmotic pressure gradient") across the semipermeable membrane 30. Osmosis is the diffusion of a solvent through a semi-permeable membrane, from a solution of lower solute concentration (hypotonic solution) to a solution with higher solute concentration (hypertonic solution). Because osmotic pressure is a colligative property, osmosis generally depends on solute concentration, but not on solute identity. Thus, forward osmosis of a solvent fluid will proceed across a semi-permeable membrane so long as the concentration of one solute is greater than the concentration of another solute, regardless of the identities of the solutes.

As the fluid to be purified flows across the semi-permeable membrane 30 and into the draw solution 24, the feed solution 18 becomes more concentrated over time. When it reaches a certain concentration, the feed solution 18 can be directed through a first conduit 42 for further processing or for return to the environment (e.g., as brine). As an example, a 3.5% NaCl seawater solution can be concentrated to a 10-15% brine solution, prior to discharge back to the ocean. Of course, other concentrations levels are suitable for deciding when to remove the concentrated feed solution 18. In certain embodiments, continuous removal of the feed solution is contemplated.

Conversely, the draw solution 24 becomes more diluted over time. The diluted draw solution 24 (or "permeate") comprising water and one or more cloud point solutes can be directed through a second conduit 44 for further processing. In certain embodiments, the diluted draw solution 24 is removed for processing when it reaches a solute concentration of between about 1 and 25%, preferably 10% or less, more preferably about 5% or less, and most preferably about 1%. In certain embodiments, continuous removal of the draw solution is contemplated.

Fluid Purification System

Figure 2:
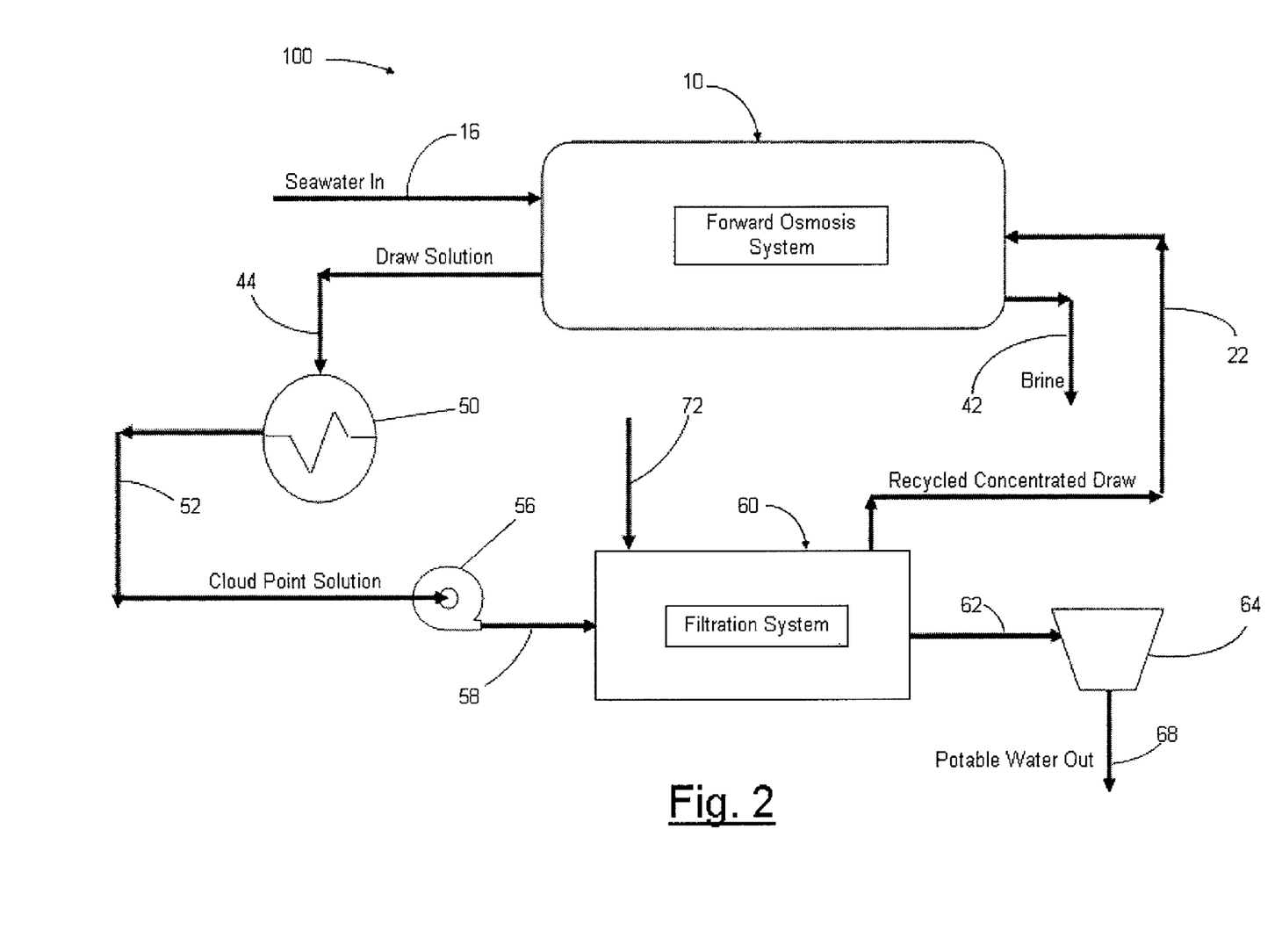
FIG. 2 is a schematic representation of a fluid purifying system comprising a forward osmosis system and a filtration system.

Reference is next made to FIG. 2, which illustrates a schematic representation of a fluid purifying system 100 comprising a forward osmosis system 10 and a filtration system 60. As explained above, the forward osmosis system 10 is configured to accept a feed solution inflow 16 and to generate a more concentrated feed solution outflow 42 for disposal or further processing. The forward osmosis system 10 is further configured to accept a draw solution inflow 22 and to generate a more dilute draw solution outflow 44, containing the fluid to be purified and cloud point solutes, for further processing.

In certain embodiments, the more dilute draw solution outflow 44 flows out of the forward osmosis system 10 and into a precipitation system 50. In certain embodiments, the draw solution (not shown) is precipitated while it is in the forward osmosis system 10 (e.g., in the draw solution reservoir, not shown).

In certain embodiments, the precipitation system 50 comprises a heating unit. In the heating unit (or in the draw solution reservoir), the temperature of the draw solution outflow 44 (or draw solution) is raised until the cloud point is reached and, preferably, slightly exceeded. For example, the draw solution outflow 44 can be raised until the temperature exceeds the cloud point by about 2-5° C. When the cloud point is reached, the cloud point solute begins to form a cloudy precipitate, due to lowered solubility in the fluid to be purified (that is, the solvent). In certain embodiments, a phase separation of the draw solution or draw solution outflow 44 can be observed. For example, the draw solution outflow 44 may separate into two immiscible layers, a solvent layer and a clouded solute layer.

In certain embodiments, the precipitation system 50 comprises a gas treatment unit. In the gas treatment unit (or in the draw solution reservoir), clouding of the draw solution outflow 44 (or draw solution) is achieved by the addition of at least one water-insoluble gas in order to lower the cloud point of the solution to ambient temperatures or thereabout. For example, methyl chloride can be bubbled through the draw solution outflow 44. In certain embodiments, the precipitation system 50 can comprise a gas treatment unit for lowering the cloud point of the solution and a heating unit for raising the temperature of the draw solution or draw solution outflow 44. Other techniques for precipitating a cloud point solute from solution are also suitable.

After phase separation and/or precipitation has occurred, the draw solution or draw solution outflow 44 is discharged as a precipitated solution 52. The precipitated solution 52 can then be directed to a filtration system 60.

The filtration system 60 is configured to remove the precipitated cloud-point solute(s) from the precipitated solution 52. In preferred embodiments, the filtration system 60 comprises a nano-filtration membrane. An example of a suitable nano-filtration membrane is Koch SelRo MPF-34. Alternative filtration systems are contemplated. Furthermore, other membranes such as reverse osmosis membranes and ultra filtration membranes and combinations of membranes are suitable.

In certain embodiments, the filtration system 60 is selected based on a molecular weight cut-off value (MWCO). In those embodiments, the filtration system 60 will preferably reject at least 90% of solutes having a molecular weight at or above the MWCO. Accordingly, the molecular weight cut-off point (MWCO) of the filtration system 60 should be lower than the molecular weight of the cloud-point solute(s) in solution. Preferably, the MWCO is about 400 Da or less, more preferably, about 300 Da or less, and most preferably 200 Da or less. In certain embodiments, the MWCO is about 100 Da or less.

Certain embodiments comprise a pressurized filtration process, such as nano-filtration or reverse osmosis. Consequently, a pump system 56 (e.g., a medium-pressure pump system) can be used to direct the precipitated solution 52 to the filtration system 60 at supra-atmospheric pressures. In certain embodiments, the filtration system 60 is operated at a pressure between about 6 and 14 atm (90 and 200 psi), more preferably between about 7 and 10 atm (100 and 150 psi), and most preferably between about 8 and 8.5 atm (120 and 125 psi). For example, the filtration system can comprises one or more reverse osmosis membranes, and the pump system 56 can direct the precipitated solution 56 to the filtration system at 8-14 atm (120-200 psi).

The filtration system 60 discharges a filtered effluent 62 comprising the fluid to be purified (e.g., water). In certain embodiments, the filtered effluent 62 can be directly output as the purified fluid 68 (e.g., potable water). In certain embodiments, the filtered effluent 62 can optionally be directed through one or more treatment processes 64, such as an activated charcoal filter. Such treatment processes 64 can advantageously be used to remove any remaining cloud-point solutes, additional organics, and/or microorganisms, etc., from the filtered effluent 62. After passing through the one or more optional treatment processes 64, the filtered effluent 62 can be output as the purified fluid 68. Preferably, the total dissolved solids (TDS) levels that remain after processing are between about 5 and 50 ppm.

Optionally, in certain embodiments, the filtration system 60 additionally discharges a re-concentrated draw solution 22. One example technique for preparing the re-concentrated draw solution 22 is flushing the filtration system 60 with a supply of fluid 72 at a temperature below the cloud point of the solutes. In an example embodiment, the re-concentrated draw solution 22 is prepared by flushing or rinsing a nanofiltration membrane in the filtration system 60 with cold water. The fluid 72 redissolves precipitated cloud-point solutes collected in the filtration system 60.

The re-concentrated draw solution 22 can then be returned to the forward osmosis system 10. Such a configuration advantageously enables a closed cycle for the cloud-point solutes to be reused in the forward osmosis fluid purification process.

U.S. Pat. No. 5,679,254 to Chakraborti discusses desalination of seawater by nonionic surfactant aided phase separation. The '254 patent describes a method for recovering relatively salt-free water by adding nonionic surfactants to aqueous salt solutions. The surfactants used are from a family of nonionic compounds called alkoxylates, which exhibit multiple cloud points to create various biphasic solutions. The temperature of the mixture is raised above a first cloud point to cause the mixture to phase separate into a first predominantly salt-rich phase and a second salt-free phase, the salt-free phase comprising water and non-ionic surfactant. The salt-free phase is subsequently separated from the salt-rich phase. The temperature of the separated salt-free phase is further raised above the second cloud point to promote an additional phase separation into a surfactant-rich phase and a surfactant-free phase. The surfactant-free phase is then separated to provide potable water.

The '254 patent differs from the systems and methods disclosed herein. For example, the '254 patent relies upon a nonionic surfactant which possesses multiple cloud points. In contrast, the disclosed systems and methods can function with a draw solution having a single cloud point. As another example, the '254 patent requires co-solvents like cyclohexanol and 2-ethylbutyl cellulose for the final water separation from the surfactant. In contrast, the cloud point solutes disclosed herein can be directly separated from the fluid to be purified using a filtration unit, such as a nanofiltration or ultrafiltration membrane, without requiring additional chemicals to be added.

Table 3 below shows the energy requirements for different conventional desalination processes used by various public water utilities. The data in Table 3 demonstrate that the systems and methods disclosed herein can reduce the operating costs of desalinating water by a factor of three to five over existing desalination technologies, such that the costs are comparable to wholesale freshwater sources.

TABLE 3

Energy Requirements for Desalination Processes

| Process | Energy costs, kWh/acre-ft of water |
| --- | --- |
| Reverse Osmosis | 6,000–12,000 |
| Multi-stage flash distillation | 3,500–7,000 |
| Multi-effect distillation | 2,500–5,000 |
| Vapor Compression | 10,000–15,000 |
| Forward Osmosis (estimated for Osmotics Technologies Inc. process) | 4,000–6,000 |
| Forward Osmosis (as disclosed) | 1,500–3,000 |

EXAMPLE 1

Determination of Cloud Point

The cloud point temperatures of cloud point solutes were determined at temperatures ranging from 10 to 70° C. and concentrations varying from 10 to 90%. Visual measurements were made at 10 C° intervals. For example, the clarity/cloudiness of the individual solutions was assessed. The data collection for one example of the cloud point solutes tested, a fatty acid-polyethylene glycol (FA-PEG) called polyethylene glycol 400 monolaurate (PEG 400 ML), is shown in Table 4 below. In Table 4, "θ" represents a visibly clear solution; a single asterisk "*" represents very slight clouding; a double asterisk "" represents more pronounced clouding; and a triple asterisk "*" represents substantial clouding. A correlation between concentration, temperatures, and cloud points can be noted, enabling a determination of the operational design points of the forward osmosis system at varying solute concentrations and temperature.

TABLE 4

Organic solute PEG 400 ML in water/temperature experiments

| Temp. (° C.) | Water Dilution (%) | | | | | | | | |
| --- | --- | --- | --- | --- | --- | --- | --- | --- | --- |
| | 10 | 20 | 30 | 40 | 50 | 60 | 70 | 80 | 90 |
| 10 | θ | θ | θ | θ | θ | θ | θ | θ | θ |
| 20 | θ | θ | θ | θ | θ | θ | θ | θ | θ |
| 30 | θ | θ | θ | θ | θ | θ | * | * | ** |
| 40 | θ | θ | θ | θ | θ | θ | * | ** | ** |
| 50 | θ | θ | θ | θ | θ | * | *** | *** | *** |
| 60 | θ | θ | θ | θ | * | *** | *** | *** | *** |
| 70 | θ | * | * | ** | *** | *** | *** | *** | *** |
| 80 | | | | | | | | | |
| 90 | | | | | | | | | |

No cloudiness was observed below 25° C., which is higher than the inlet seawater temperature for most areas of North America. At 30° C., slight cloudiness for solutions containing more than 70% water was observed. Complete cloudiness and phase separation occurred above 50° C. for the 70-90% water solution.

Based upon Table 4, an example process can be derived to treat a seawater feed solution having a temperature of 20° C. A concentrated draw solution with 50% concentration of PEG-400 ML is prepared. The draw solution is diluted through forward osmosis as fresh water moves from the feed solution through a semi-permeable membrane, until the draw solution reaches about 90% water content (that is, a 10% concentration of PEG-400 ML). The draw solution is subsequently heated to about 50° C. to trigger clouding of the PEG-400 ML. The clouded draw solution (comprising precipitated PEG-400 ML and water) is passed through a nanofiltration membrane to remove the precipitated PEG-400 ML. Where recycling is included, the PEG-400 ML collected on the nanofiltration membrane is dissolved back into solution as a re-concentrated draw solution by flushing the nanofiltration membrane with cold water to create a 50% concentrated draw solution.

Numerous other processes for obtaining purified fluids from an impure feed solution using cloud point solutes can be derived as well following similar principles, for example, using cloud point solutes with varying ranges of cloud points over different concentrations and temperatures.

EXAMPLE 2

Cloud Point Solute Concentration

Figure 3:
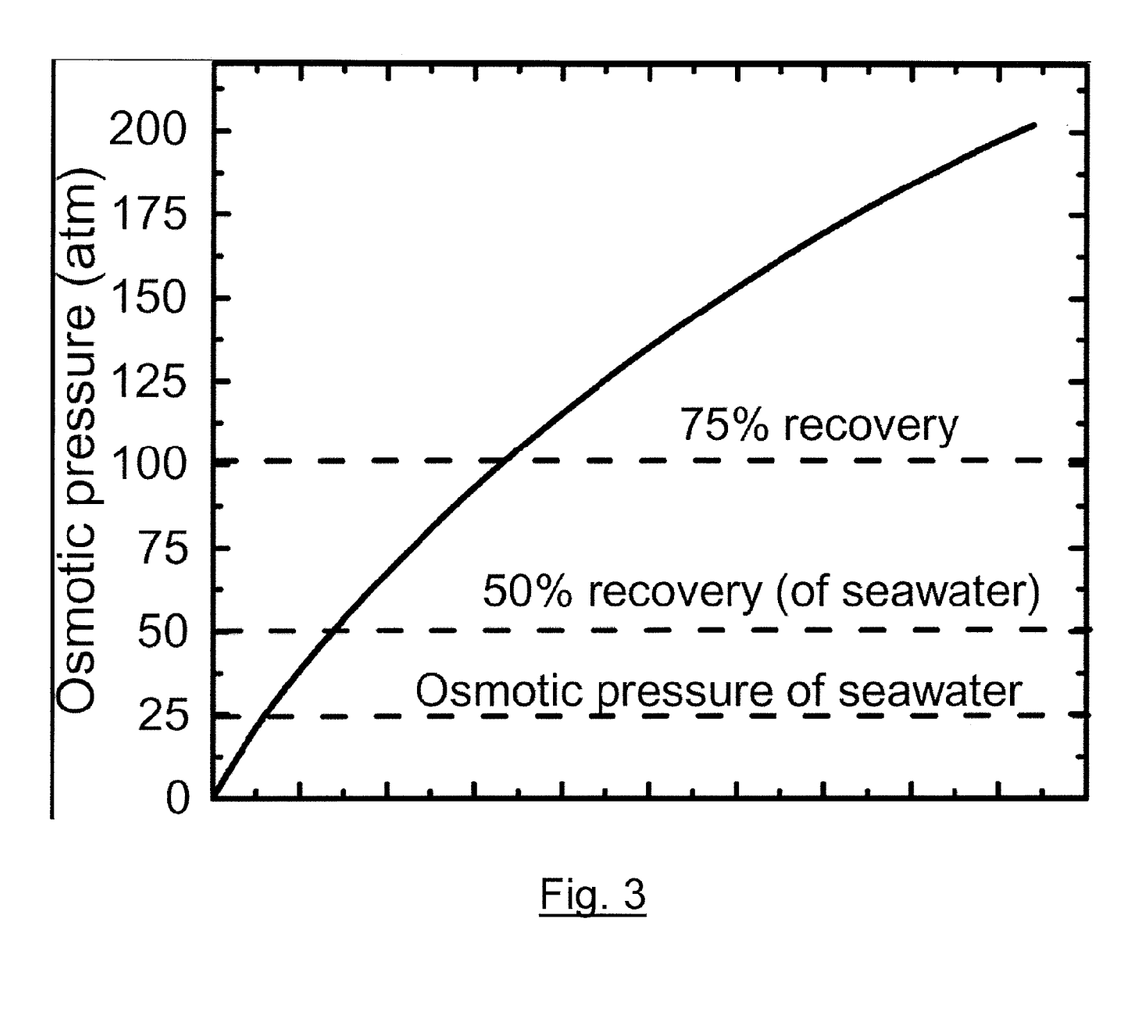
FIG. 3 is a graph correlating draw solution concentration and osmotic pressure.

Higher concentrations of cloud point solutes in the draw solution 24 compared with the concentration of impurities in the feed solution 18 can advantageously improve recovery rates of the fluid to be purified. FIG. 3 shows osmotic pressures and water recovery rates obtained for an example forward osmosis system, from a seawater solution having an osmotic pressure of 27.2 atm. In this example, ammonium carbonate was used as the solute in the draw solution. However, as described in more detail above, because osmotic pressure depends on the number of dissolved particles in solution, but not on the identities of the solutes, similar results would also be obtained using cloud point solutes. As shown in this example, a 50% recovery of water from seawater can be achieved by using a draw solution having an osmotic pressure that is greater than twice that of seawater, while a 75% water recovery can be achieved with a draw solution having an osmotic pressure that is greater than four times that of seawater. As shown here, the research team was able to demonstrate a 90% recovery of freshwater using forward osmosis through a semi-permeable membrane. As shown in FIG. 3, the concentration of the draw solution is directly proportional to the osmotic pressure generated.

EXAMPLE 3

Forward Osmosis Membranes

Suitable membranes were evaluated for use with the forward osmosis processes disclosed herein. Prior to use, all membranes were soaked in deionized water for at least 15 minutes to allow any glycerin or sodium metabisulfite to diffuse out of the membrane. Each membrane tested against selected draw solutions. The draw solutions were prepared in different weight percentages to give rise to different osmotic pressures as shown in Table 5, below, which lists certain example initial osmotic pressures for FA-PEG cloud point solutions, namely fatty acid-polyethylene glycol 300 (FA-PEG 300), fatty acid-polyethylene glycol 400 (FA-PEG 400), and fatty acid-polyethylene glycol 600 (FA-PEG 600). The membranes and draw solutions were placed in the forward osmosis system 10 shown in FIG. 1, with a feed solution concentration of 3.5% NaCl in water.

TABLE 5

Osmotic Pressures for Various Solutes in Water

| Solute (%) | Solvent | Osmotic Pressure (atm) |
|---|---|---|
| Seawater (3.5% NaCl) | water | 27.2 |
| FA-PEG 300 (50%) | water | 79.9 |
| FA-PEG 300 (70%) | water | ~113.9 |
| FA-PEG 400 (50%) | water | ~150 |
| FA-PEG 400 (75%) | water | ~237.3 |
| FA-PEG 600 (67.5%) | water | ~305 |

Each solution was tested against several membranes, the feed solution and draw solution were monitored over a period of 4 to 5 hours, and the data were collected. At least three trials were carried out for each draw solution and membrane. From the collected data, flow rates were calculated and compared. The calculated flow rates for reverse osmosis membranes are shown in Tables 6a and 6b, below. The calculated flow rates for forward osmosis membranes are shown in Table 7, below.

TABLE 6a

Flow Rates, in mL/hr per cm$^2$ of membrane (by trial, membrane and draw solution)

| | Culligan (RO) | | | Hydrotech (RO) | | | CTA (no backing) | | |
|---|---|---|---|---|---|---|---|---|---|
| | \multicolumn{9}{c}{Trial} |
| | 1 | 2 | 3 | 1 | 2 | 3 | 1 | 2 | 3 |
| 50% FA-PEG 300 | 0.062 | 0.062 | 0.062 | 0.062 | 0.062 | 0.062 | x | x | x |
| 70% FA-PEG 300 | 0.12 | 0.12 | 0.062 | 0.062 | 0.12 | 0.062 | x | x | x |
| 50% FA-PEG 400 | 0.12 | 0.062 | 0.062 | 0.062 | 0.12 | x | x | x | x |
| 75% FA-PEG 400 | x | 0.062 | 0.062 | 0.062 | x | 0.062 | x | x | x |
| 67.5% FA-PEG 600 | 0.062 | 0.062 | x | 0.062 | 0.12 | 0.062 | x | x | x | x - denotes no movement in draw and feed level

TABLE 6b

Flow Rates, in mL/hr per cm$^2$ of membrane

| | Microline (RO) | | | Rainsoft (RO) | | |
|---|---|---|---|---|---|---|
| | \multicolumn{6}{c}{Trial} |
| | 1 | 2 | 3 | 1 | 2 | 3 |
| 50% FA-PEG 300 | 0.062 | 0.062 | 0.062 | 0.062 | 0.062 | 0.062 |
| 70% FA-PEG 300 | 0.062 | 0.062 | 0.062 | 0.062 | 0.12 | 0.12 |
| 50% FA-PEG 400 | 0.12 | 0.12 | x | 0.062 | 0.12 | 0.062 |
| 75% FA-PEG 400 | 0.062 | X | 0.062 | 0.062 | 0.062 | 0.062 |
| 67.5% FA-PEG 600 | 0.062 | 0.062 | 0.062 | 0.12 | 0.062 | 0.062 |

TABLE 7

Flow Rates, in mL/hr per cm$^2$ of membrane (by trial, membrane and draw solution)

| | Sea-Pack (FO) | | | X-Pack (FO) | | | Hydrowell (FO) | | |
|---|---|---|---|---|---|---|---|---|---|
| | \multicolumn{9}{c}{Trial} |
| | 1 | 2 | 3 | 1 | 2 | 3 | 1 | 2 | 3 |
| 50% FA-PEG 300 | 0.19 | 0.25 | 0.14 | 0.17 | 0.17 | 0.22 | 0.28 | 0.36 | 0.17 |
| 70% FA-PEG 300 | 0.24 | 0.25 | 0.2 | 0.21 | 0.31 | 0.29 | 0.36 | 0.37 | 0.31 |
| 50% FA-PEG 400 | 0.11 | 0.25 | 0.20 | 0.16 | 0.17 | 0.19 | 0.26 | 0.23 | 0.29 |
| 75% FA-PEG 400 | 0.24 | 0.25 | 0.23 | 0.21 | 0.23 | 0.23 | 0.28 | 0.25 | 0.36 |
| 67.5% FA-PEG 600 | 0.21 | 0.23 | 0.19 | 0.21 | 0.22 | 0.2 | 0.28 | 0.28 | 0.28 |

In these tests, it was observed that membranes specifically manufactured for forward osmosis resulted in higher flow rates than membranes specifically manufactured for reverse osmosis. The flow rates of the forward osmosis membranes were almost 2 to 3 times faster than flow rates for commercially available reverse osmosis membranes.

EXAMPLE 3

Draw Solution Testing

Forty combinations of draw solutions and membranes were evaluated, as shown below in Table 8. Eight different membranes, both reverse osmosis membranes and forward osmosis membranes, were evaluated. Five different draw solutions were evaluated. Seawater was used as a feed solution in each system. The seawater was changed daily until the draw solution no longer increased in its volume.

TABLE 8

Flow Rates (mL/hr per cm$^2$ of membrane)

| | Culligan CTA | Hydrotech CTA | Microline CTA | Rainsoft CTA | CTA No Backing | HTI HYDROWELL | HTI X-PACK | HTI SEAPACK |
|---|---|---|---|---|---|---|---|---|
| FA-PEG 300 50% | 0.062 | 0.062 | 0.062 | 0.062 | 0 | 0.320 | 0.170 | 0.165 |
| FA-PEG 300 70% | 0.12 | 0.062 | 0.062 | 0.12 | 0 | 0.365 | 0.300 | 0.245 |
| FA-PEG 400 50% | 0.062 | 0.091 | 0.120 | 0.062 | 0 | 0.275 | 0.165 | 0.225 |
| FA-PEG 400 75% | 0.062 | 0.062 | 0.062 | 0.062 | 0 | 0.265 | 0.230 | 0.245 |
| FA-PEG 600 67.5% | 0.062 | 0.062 | 0.062 | 0.062 | 0 | 0.280 | 0.215 | 0.220 |

HTI = Hydration Technologies International

Although each draw solution initially had a different osmotic pressure, the point where the draw solution no longer drew water molecules across the membrane was roughly the same. For example, 20 mL of a 50% solution of PEG 300 had a 10 mL increase in volume, and 20 mL of a 50% solution of PEG 400 also increased the same amount in volume. As shown in Table 8, the highest flow rates were observed with a PEG 300 cloud point solute at 70% concentration in water using HydroWell™ membranes.

Although this invention has been described in terms of certain preferred embodiments, other embodiments that are apparent to those of ordinary skill in the art, including embodiments which do not provide all the benefits and features set forth herein, are also within the scope of this invention.

What is claimed is:

1. A process for purification of a feed solution characterized by a concentration of impurities dissolved in a solvent, the process comprising:

at a first temperature, exposing the feed solution to one side of a semi-permeable membrane;

directing a draw solution to an opposite side of the membrane, the draw solution comprising an organic solute, the organic solute comprising a hydrophobic component and a hydrophilic component;

where an initial concentration of the organic solute in the draw solution is at least three times the concentration of impurities in the feed solution to be purified so that an osmotic pressure differential exists between the feed solution and the draw solution, the osmotic pressure differential inducing forward osmosis across the membrane, drawing solvent from the feed solution across the membrane to provide a diluted draw solution while increasing the concentration of impurities in the feed solution, wherein the diluted draw solution has a cloud point temperature above the first temperature; and following forward osmosis, heating the diluted draw solution to just above the cloud point temperature, thereby triggering precipitation of the organic solute.

2. The process of claim 1, further comprising removing precipitated organic solute from the diluted draw solution using a mechanism of filtration to provide filtered organic solute for recyclable use.

3. The process of claim 2, further comprising re-dissolving the filtered organic solute into a new draw solution by reverse flushing the mechanism of filtration at a temperature below that of the cloud point temperature.

4. The process of claim 1, wherein the organic solute comprises a polymer.

5. The process of claim 1, wherein the organic solute has a molecular weight of about 200-600 Daltons.

6. The process of claim 1, wherein the cloud point temperature is in the temperature range of about 35-70° C.

* * * * *